(12) United States Patent
Achituv et al.

(10) Patent No.: US 9,990,920 B2
(45) Date of Patent: *Jun. 5, 2018

(54) SYSTEM AND METHOD OF AUTOMATED LANGUAGE MODEL ADAPTATION

(71) Applicant: Verint Systems Ltd., Herzilya Pituach (IL)

(72) Inventors: Ran Achituv, Hod Hasharon (IL); Omer Ziv, Ramat Gan (IL); Ido Shapira, Tel Aviv (IL); Daniel Baum, Modiin (IL)

(73) Assignee: VERINT SYSTEMS LTD., Herzilya Pituach (IL)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/332,411

(22) Filed: Oct. 24, 2016

(65) Prior Publication Data
US 2017/0098445 A1 Apr. 6, 2017

Related U.S. Application Data

(63) Continuation of application No. 14/291,895, filed on May 30, 2014, now Pat. No. 9,508,346.
(Continued)

(51) Int. Cl.
*G10L 15/26* (2006.01)
*G10L 15/197* (2013.01)
(Continued)

(52) U.S. Cl.
CPC .......... *G10L 15/197* (2013.01); *G10L 15/063* (2013.01); *G10L 15/083* (2013.01); *G10L 2015/0635* (2013.01); *H04M 3/51* (2013.01)

(58) Field of Classification Search
CPC ..... G10L 15/063; G10L 15/065; G10L 15/26; G10L 15/01; G10L 15/22; G10L 15/18;
(Continued)

(56) References Cited

U.S. PATENT DOCUMENTS 6,173,259 B1 * 1/2001 Bijl ........................... G06F 3/16
704/235
6,766,294 B2 7/2004 MacGinite et al.
(Continued)

FOREIGN PATENT DOCUMENTS

GB 2375211 11/2002

OTHER PUBLICATIONS

Tranter et al., "An Overview of Automatic Speaker Diarization Systems" IEEE Transactions on Audio, Speech, and Language Processing, vol. 14, No. 5, Sep. 2006, pp. 1557-1565.*
(Continued)

*Primary Examiner* — Vijay B Chawan
(74) *Attorney, Agent, or Firm* — Meunier Carlin & Curfman

(57) ABSTRACT

Systems and methods of automated adaptation of a language model for transcription of audio data include obtaining audio data. The audio data is transcribed with a language model to produce a plurality of audio file transcriptions. A quality of the plurality of audio file transcriptions is evaluated. At least one best transcription from a plurality of audio file transcriptions is selected based upon the evaluated quality. Statistics are calculated from the selected at least one best transcription from the plurality of audio file transcriptions. The language model is modified from the calculated statistics.

18 Claims, 6 Drawing Sheets

Related U.S. Application Data

(60) Provisional application No. 61/870,842, filed on Aug. 28, 2013, provisional application No. 61/870,843, filed on Aug. 28, 2013.

(51) Int. Cl.
*G10L 15/06* (2013.01)
*G10L 15/08* (2006.01)
*H04M 3/51* (2006.01)

(58) Field of Classification Search
CPC ..... G10L 15/1822; G10L 15/07; G10L 15/08; G10L 15/183; G10L 15/187; G06F 17/3002; G06F 17/30026; G06F 15/30746; G06F 17/30778; G06F 17/2775; G06F 17/28; G06F 19/3847; G06F 3/16
USPC ... 704/235, 257, 270, 246, 251, 255, 275, 9, 704/10, 2, 234, 239, 243, 244, 256.5
See application file for complete search history.

(56) References Cited

U.S. PATENT DOCUMENTS

| | | | | |
|---|---|---|---|---|
| 6,776,294 | B2* | 8/2004 | Lemonnier | B01D 29/05 210/321.84 |
| 6,839,669 | B1* | 1/2005 | Gould | G10L 15/22 704/246 |
| 7,092,888 | B1* | 8/2006 | McCarthy | G10L 15/063 379/88.01 |
| 7,149,687 | B1* | 12/2006 | Gorin | G10L 15/063 704/243 |
| 7,574,358 | B2* | 8/2009 | Deligne | G10L 15/18 704/243 |
| 7,818,175 | B2* | 10/2010 | Carus | G10L 15/22 704/235 |
| 8,306,819 | B2* | 11/2012 | Liu | G10L 15/065 704/234 |
| 8,775,174 | B2* | 7/2014 | Conejero | G06F 17/3002 704/235 |
| 2004/0088162 | A1* | 5/2004 | He | G10L 15/063 704/235 |
| 2006/0026003 | A1* | 2/2006 | Carus | G10L 15/22 704/275 |
| 2006/0028416 | A1* | 2/2006 | Lee | G09G 3/2011 345/89 |
| 2006/0149558 | A1 | 7/2006 | Kahn et al. | |
| 2009/0248416 | A1 | 10/2009 | Gorin et al. | |
| 2010/0094618 | A1 | 4/2010 | Zimmerman et al. | |
| 2010/0179803 | A1 | 7/2010 | Sawaf et al. | |
| 2010/0250240 | A1 | 9/2010 | Shu | |
| 2011/0320197 | A1* | 12/2011 | Conejero | G06F 17/3002 704/235 |
| 2012/0203720 | A1 | 8/2012 | Baker | |
| 2013/0238329 | A1 | 9/2013 | Casella dos Santos | |

OTHER PUBLICATIONS

Nakano et al., "Using Untranscribed User Utterances for Improving Language Models Based on Confidence Scoring", Proceedings Interspeech 2003, Sep. 4, 2003, pp. 417-420.*

Gretter, R., et al., "On-Line Learning of Language Models with Word Error Probability Distributions," Proceedings of the IEEE International Conference on Acoustics, Speech, and Signal Processing, 2001, pp. 557-560.

Mangu, L., et al., "Finding consensus in speech recognition: word error minimization and other applications of confusion networks," Computer Speech and Language, vol. 14, 2000, pp. 373-400.

Nakano, M., et al. "Using Untranscribed User Utterances for Improving Language Models based on Confidence Scoring," Eurospeech, 2003, pp. 417-420.

Tranter, et al., "An Overview of Automatic Speaker Diarization Systems," IEEE Transaction on Audio, Speech, and Language Processing, vol. 14, No. 5, 2006, pp. 1557-1565.

Viterbi, A.J., "Error Bounds for Convolutional Codes and an Asymptotically Optimum Decoding Algorithm," IEEE Transactions on Information Theory, vol. 13, No. 2, 1967, pp. 260-269.

Xu, H., et al., "Minimum Bayes Risk decoding and system combination based on a recursion for edit distance," Computer Speech & Language, vol. 25, Issue 4, 2011, pp. 802-828.

Extended European Search Report, dated Dec. 8, 2014, received in connection with corresponding European Application No. 14182492.0.

* cited by examiner

SYSTEM AND METHOD OF AUTOMATED LANGUAGE MODEL ADAPTATION

CROSS-REFERENCE TO RELATED APPLICATION

The present application is a continuation of U.S. Patent application Ser. No. 14/291,895 filed on May 30, 2014, which claims the benefit of U.S. Provisional Patent Applications Nos. 61/870,842 and 61/870,843, both of which were filed on Aug. 28, 2013. Each of the aforementioned applications are hereby entirely incorporated by reference herein.

BACKGROUND

The accuracy of an automated transcription of audio data can be improved through the use of one or more models that are tailored to reflect one or more of the subjects in the audio data. In the exemplary embodiment of a customer service call center, the audio data is a recording or a stream of a customer service interaction between a customer service agent and a customer. In many cases the customer service interaction will pertain to specific technology, complaints, customer services, or other issues that are related to the products or services offered by a company. In a merely exemplary embodiment, a company in the cellular communications business may have customer service interactions related to particular devices (e.g., cell phones), customer complaints (e.g., billing dispute), or specific customer service activity (e.g., add, modify, or cancel service). A model may be created to reflect these topics or specialized vocabulary related to these topics that arise in the customer service interactions greater than these topics or vocabulary arise in a generalized model of speech communication. In another embodiment, a customer service call center may specifically focus on interactions with customers from a particular country or region and those customers may use a distinct vocabulary (e.g., language or dialect) in customer service interactions.

Currently, the creation of these topically or regionally adapted models is expensive and time consuming as these models rely upon manual transcriptions in order to ensure that the transcription is correct and then these manually transcribed customer service interactions can be extrapolated into adapted models.

BRIEF DISCLOSURE

An exemplary embodiment of a method of automated adaptation of a language model for transcription of audio data includes obtaining audio data from a plurality of audio files. The audio data is transcribed with a language model to produce a plurality of audio file transcriptions. At least one audio file transcription of the plurality is associated to each audio file of the plurality of audio files. A quality of the plurality of audio file transcriptions is evaluated. At least one best transcription from the plurality of audio file transcriptions is selected based upon the evaluated quality. Statistics are calculated from the selected best transcription from the plurality of audio file transcriptions. The language model is modified based upon the calculated statistics.

An exemplary embodiment of a system for automated adaptation of a language model for transcription of audio data includes an audio data source. A plurality of audio data files are stored on the audio data source. A processor receives the plurality of audio data files and applies a language model to the plurality of audio data files to produce transcriptions of each of the plurality of audio data files. A non-transient computer readable medium is communicatively connected to the processor and is programmed with computer readable code that when executed by the processor causes the processor to evaluate a quality of each of the plurality of audio data file transcriptions. The processor further selects at least one best transcription from the transcriptions of each of the plurality of audio data file. The processor calculates statistics from the selected at least one best transcription. The processor further modifies the transcription model based upon the calculated statistics.

An exemplary embodiment of a non-transient computer readable medium is programmed with computer readable code that upon execution by a computer processor causes the computer processor obtain audio data from a plurality of audio files. The computer processor further transcribes the audio data with a language model to produce a plurality of audio file transcriptions. At least one audio file transcription of the plurality of associated to each audio file of the plurality of audio files. A quality of the plurality of audio file transcriptions is evaluated. At least one best transcription from a plurality of audio file transcriptions is selected based upon the evaluated quality. Statistics are calculated from the selected data least one beast transcription from the plurality of audio file transcriptions. The language model is modified based upon the calculated statistics.

DETAILED DISCLOSURE

Systems and methods as disclosed herein are directed to the automated generation of adapted language models use for automated transcription of audio data. In a merely exemplary embodiment used in the present disclosure, the systems and methods as disclosed herein are directed to the automated generation of language models modeling the speech of customers in customer service interactions. It will be recognized that the systems and methods as disclosed herein are not limited to exclusive analysis of speech in customer service interaction, but may also be applicable in other automated transcription contexts.

Figure 1:
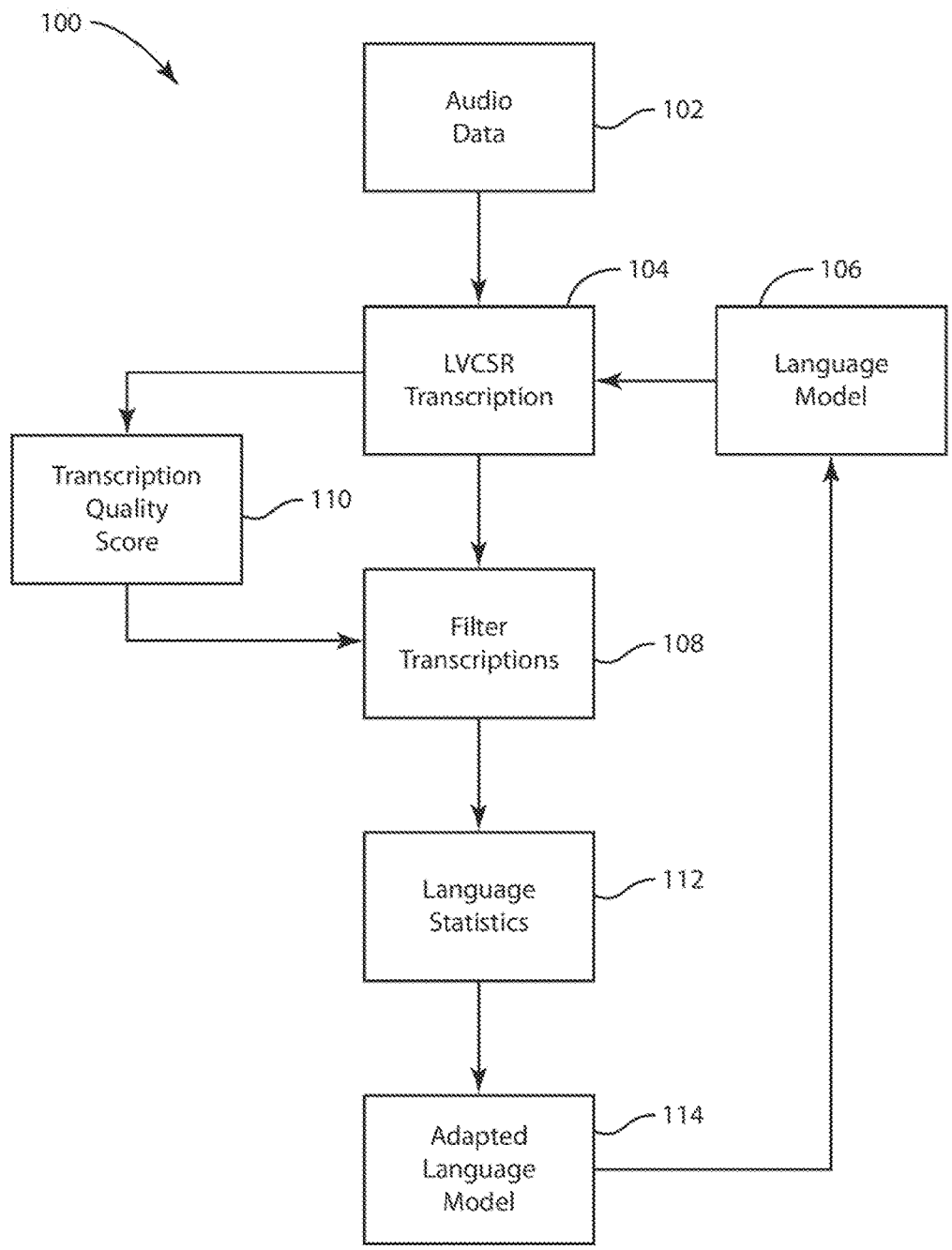
FIG. 1 is a flowchart that depicts an exemplary embodiment of a method of automated language model adaptation.
Figure 2:
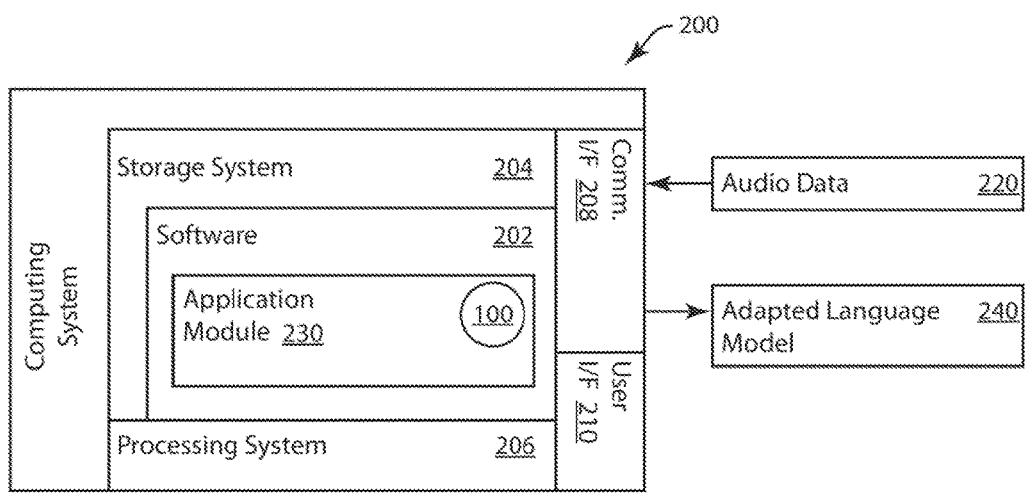
FIG. 2 is a system diagram of an exemplary embodiment of a system for automated language model adaptation.

FIG. 1 is a flow chart that depicts an exemplary embodiment of a method 100 of automated language model adaptation. FIG. 2 is a system diagram of an exemplary embodiment of a system 200 for automated language model adaptation. The system 200 is generally a computing system that includes a processing system 206, storage system 204, software 202, communication interface 20$ and a user interface 210. The processing system 206 loads and executes software 202 from the storage system 204, including a software module 230. When executed by the computing system 200, software module 230 directs the processing system 206 to operate as described in in further detail herein in accordance with the method 100 of FIG. 1 and may further operate as described herein with respect to the method 300 of FIG. 3.

Although the computing system 200 as depicted in FIG. 2 includes one software module in the present example, it should be understood that one or more modules could provide the same operation. Similarly, while the description as provided herein refers to a computing system 200 and a processing system 206, it is to be recognized that implementations of such systems can be performed using one or more processors, which may he communicatively connected, and such implementations are considered to be within the scope of the present disclosure.

The processing system 206 can include a microprocessor and other circuitry that retrieves and executes software 202 from storage system 204. Processing system 206 can be implemented within a single processing device but can also be distributed across multiple processing devices or subsystems that cooperate in executing program instructions. Examples of processing, system 206 include general purpose central processing units, application specific processors, and logic devices, as well as any other type of processing devices, combinations of processing devices, or variations thereof.

The storage system 204 can include any storage media readable by processing system 206 and capable of storing software 202. The storage system 204 can include volatile and non-Volatile, removable and non-removable media implemented in any method or technology for storage of information, such as computer readable instructions, data structures, program modules, or other data. Storage system 204 can be implemented as a single storage device but may also be implemented across multiple storage devices or sub-systems. Storage system 204 can further include additional elements, such a controller, of communicating with the processing system 206.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media.

User interface 210 can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display an interface further associated with embodiments of the system and method as disclosed, herein. Speakers, printers, haptic devices and other types of output devices may also be included in the user interface 210.

As described in further detail herein, the computing system 200 receives and transmits data through the communication interface 208. In embodiments, the communication interface 208 operates to send and/or receive data to/from other devices to facilitate and or carry out the operations of the execution of the software module 230 by the processing system 206. The audio data 220 may be an audio recording or a conversation, which may exemplarily be between two speakers, although the audio recording may be ally of a variety of other audio records, including multiple speakers, a single speaker, or an automated or recorded auditory message. The audio file may exemplarily be a .WAV file, but may also be other types of audio files, exemplarily in a pulse code modulated (PCM) format and a further example may include linear pulse code modulated (LPCM) audio data. Furthermore, the audio data is exemplarily mono audio data however, it is recognized that embodiments of the method as disclosed herein may also be used with stereo audio data. In still further embodiments, the audio data 200 may be streaming audio data received in real time or near-real time by the computing system 200.

FIG. 1 is a flowchart that depicts an exemplary embodiment of a method 100 of automated language model adaptation. In the method 100 at 102 audio data is received. As noted above, the audio data may exemplarily he recorded audio data from a plurality of customer service interactions between at least a customer service agent and a customer. It is recognized that this is merely an exemplary embodiment used for the purpose of context and other embodiments within the scope of the present disclosure may be used to create or modify language modules for use in other audio transcription functions or applications. The audio data may exemplarily be recorded as a .WAV file and be recorded in mono audio format. In an exemplary embodiment as described in further detail herein, the audio data may comprise in excess of 1,000 hours of audio data acquired from a plurality of customer service interactions. These customer service interactions may occur and be recorded in parallel such that a plurality of customer service interactions are ongoing at any one time, exemplarily at a customer service call center. However, it will be recognized that in alternative embodiments other temporal amounts of audio data may be used, and this example is in no way intended to be limiting on the scope of the present disclosure.

The audio data received at 102 undergoes automated transcription, exemplarily a large vocabulary continuous speech recognition (LVCSR) transcription at 104. While not depicted in FIG. 1, it is understood that the audio data received at 102 may also undergo various forms of pre-processing prior to LVCSR transcription at 104. Such pre-processing may include segmentation, exemplarily with a voice activity detector (VAD) in order to segment the audio data into a series of utterances, which are segments of audio data that are likely to be speech separated by segments of audio data that are likely to be non-speech segments.

The plurality of utterances are provided to an LVCSR transcription decoder for transcription at 104. In an exemplary embodiment, an LVCSR decoder can operate by applying one or more models, including one or more language models to the audio data segmented into utterances. In such embodiment, the LVCSR decoder receives a language model 106 for use in the LVCSR transcription at 104. In the LVCSR transcription at 104, the language model is applied to the utterances of the audio data. In exemplary embodiments as disclosed herein, the language model 106 may be a generalized language model representative of the distribution of words, word pairs, word triplets, or other phrases in speech while in other embodiments, the language model 106 may be specialized to represent or incorporate a statistical distribution of words and terms in a specific industry, technical, or scientific field, or specific to a language or a dialect, or expected in the received audio data. In still further embodiments, the language model may further statistically relate the likelihood that particular words will be adjacent or close to one another within the identified industry, technical field, scientific field, or language or dialect.

Given an input that represents the spoken utterance, the simplest output format of an LVCSR transcription at 104 is a sequence of recognized words, along with word boundaries. For example, the start and end time-stamp of each output word can be determined. In a non-limiting embodiment this may be performed using the Viterbi algorithm as described in Viterbi A. J. "Error bounds for convolutional codes and an asymptotically optimum decoding algorithm". *IEEE Transactions on Information Theory* 13(2): 260-269 (1967) which is hereby incorporated by reference in its entirety. However, in recognition of the complexity and uncertainly in the outputs, an output format that represents alternative outputs may be desirable.

Figure 4:
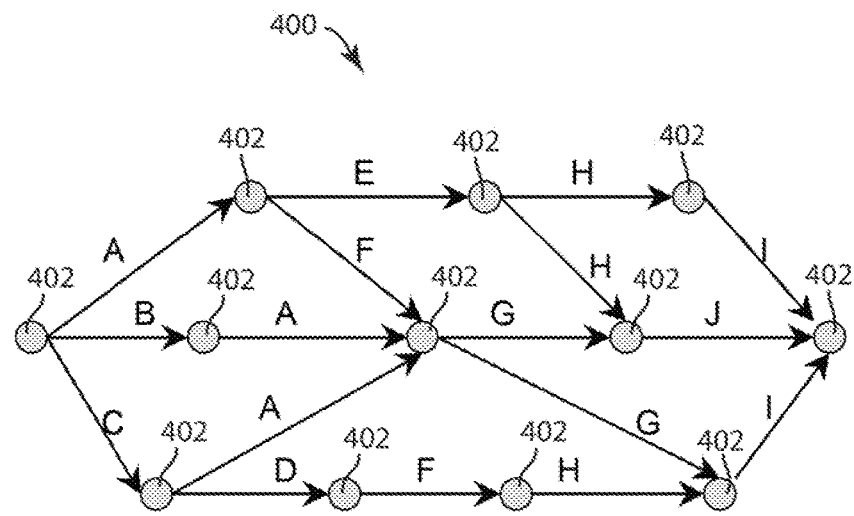
FIG. 4 depicts an exemplary embodiment of a word lattice output from an automated transcription.

In an embodiment disclosed herein, the Viterbi algorithm as used in the LVCSR transcription at 104 is modified such that it may also output a plurality of word lattices, which may be used in embodiments to calculate one or more transcription quality scores at 110 as described in further detail herein. In alternative embodiments, the word lattice may be used as the transcription output from the LVCSR transcription of 104 and filtered at 108. A word lattice is a weighted and directed graph whose nodes are associated with time stamps and whose arcs are labeled with output words, where the weight of each arc is the log-likelihood of the corresponding word. FIG. 4 depicts a non-limiting exemplary embodiment of a word lattice exemplarily output from the LVCSR transcription at 104. The positions of the nodes 402 represent the order of those nodes 402 along the time axis. Each of the letters (A-1) represent words in the possible transcription.

Figure 3:
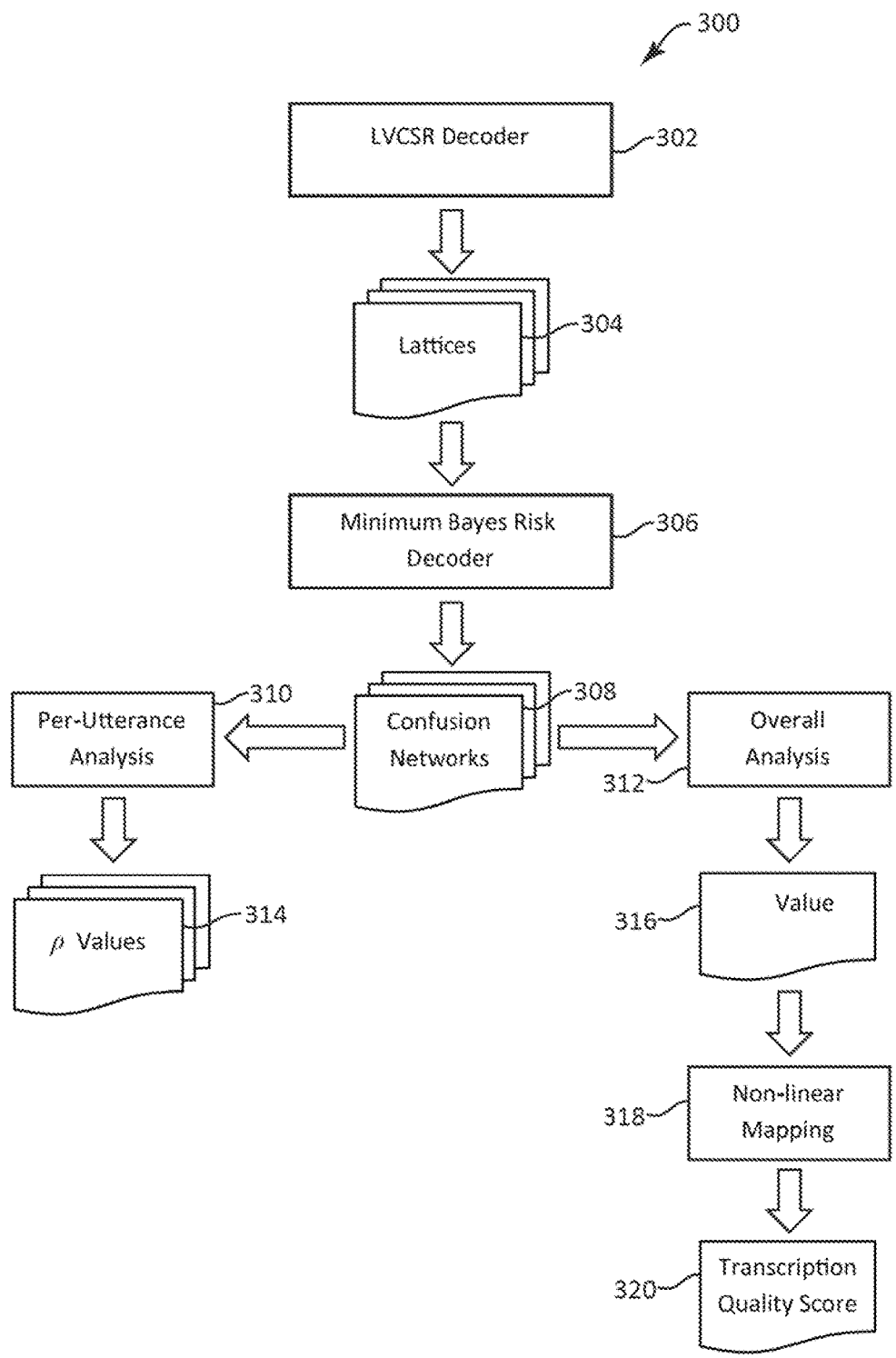
FIG. 3 is a flowchart that depicts an exemplary embodiment of a method of automated evaluation of transcription quality

At 108, the transcriptions produced at 104 are filtered in order to select only the highest quality transcriptions for use in creating the adapted language model as disclosed herein. In exemplary embodiments, various measures of transcription quality can be used; however, in one embodiment a transcription quality score calculated at 110 from the word lattices output from the LVCSR transcription at 104 are calculated as described in further detail herein is used to filter out low quality transcriptions from the plurality of transcriptions. In one embodiment, a transcription quality score is a normalized score on a scale of 1-100 that it is representative of the quality of the transcription. FIG. 3, which is described in further detail herein, is a flowchart that depicts an exemplary embodiment of a method of evaluation of transcription quality.

In an embodiment, the filtering at 108 may be on a customer service interaction by a customer service interaction basis as a transcription quality score calculated at 110. In an embodiment, the transcription quality score can be calculated for an entire transcription of an audio file. In a further embodiment, the transcriptions selected as being high quality overall transcriptions may be further filtered on an utterance by utterance basis to select only the highest quality transcribed, utterances from the highest quality customer service interaction transcriptions for use in constructing the adaptive language model. As described in further detail herein the transcription quality score at. 110 can be calculated on an utterance by utterance basis as well.

The filtering of the transcriptions at 108 selects the highest quality transcriptions or utterance transcriptions as a transcription corpus for further processing as described herein. The corpus is comprised of high quality transcriptions and is used to calculate language statistics at 112. The language statistics calculations at 112 may be a statistical analysis of the occurrences of individual words, word pairs, word triplets, or long phrases or scripts found in the high quality transcriptions. In an embodiment, new words that appear in the language statistics may be identified for addition into a dictionary or grammar which may be used as a component in constructing other transcription models. The language statistics include word pairs and word triplets and further include the likelihood of specific words occurring in proximity to one another in the transcription corpus. In still additional embodiments, the language statistics may be represented as a likelihood increase or decrease for the occurrence of the words, word pairs, word triplets, long phases, etc. from a baseline or generalized likelihood for such occurrences.

The language statistics from 112 are then used to construct an adaptive language model at 114. The adaptive language model can be constructed by adapting a generalized language model to reflect the specific language statistics identified at 112 which are more representative of the language experienced in the customer service interactions handled at the customer service call center. In an embodiment; this adaptive language model from 114 can be used as the language model 106 used in future transcriptions of audio data.

The method 100 generally represents a single iteration of a method 100 of automated language model adaptation. In an embodiment, the method 100 may be applied in an iterative fashion to regularly update and modify a language model used for transcription of audio data. In such an embodiment, an adaptive language model may be constructed periodically, exemplarily every day, two days, week, or other time interval in order to continually update the language model to reflect the language experienced in customer service interactions. This can create a system that is sensitive to changes in the frequency of words used during the life cycle of a system. Exemplarily, the introduction of a new product may result in new topics in customer service interactions and a regularly updated language model may reflect these new customer trends. In one exemplary embodiment, on an initial implementation, a generalized language model may be used for the LVCSR transcriptions. Once a first adaptive language model is constructed in the manner as described above, that adaptive language model will be used for subsequent LVCSR transcriptions until a next adaptive language model is constructed from the subsequent customer service interactions, hi another exemplary embodiment, an entirely new adaptive language model is constructed with each iteration of the method, while in an alternative embodiment each subsequent adaptive language model is constructed by updating the previous adaptive language model such that previous adaptations arc not lost, but the model continues to reflect current trends in customer service interaction.

FIG. 3 is a flowchart that depicts an exemplary embodiment of a method 300 of automated evaluation of transcription quality as may be performed at 110 in the method 100 described above with respect to FIG. 1.

As also described above with respect to FIG. 1, an LVCSR decoder 302 applies at least one language model to the plurality of utterances to produce a transcription of the audio data exemplarily in the form of one or more word lattices 304.

While the word lattices output at 304 may be used for representing alternative outputs in a manner that minimizes sentence error rate, it is possible to convert a word lattice to an alternative format of a confusion network. The confusion network minimizes the word error rate of the LVCSR decoder 302 rather than the sentence error rate. This may exemplarily be performed using a minimum Bayes risk decoder at 306. There are several methods for converting a word lattice to a confusion network. One embodiment of which is described by Xu H., Povey D., Mangu L., Zhu J. "Minimum Bayes Risk decoding and system combination based on a recursion for edit distance," Computer Speech & Language 25(4): 802-828 (2011), which is hereby incorporated by reference in its entirety, in such an embodiment, the word sequence is extracted along the best path in the lattice. This path is padded with epsilon symbols (e.g. the path becomes $\epsilon_1, W_1, \epsilon_1, W_2, \epsilon \ldots W_N, \epsilon$). The path is recursively aligned with the rest of lattice paths. This results in a confusion network at 308 that contains 2n+1 bins, denoted $B_0, B, \ldots, B_2$, where the most probable arcs of the bins with odd indices (namely $B_1, B_3, \ldots$) are labeled with non-epsilon arcs, and the most probable arcs of the bins with even indices (namely $B_0, B_2 \ldots$) have $\epsilon$-labels; we refer to these bins as $\epsilon$-bins.

Figure 5:
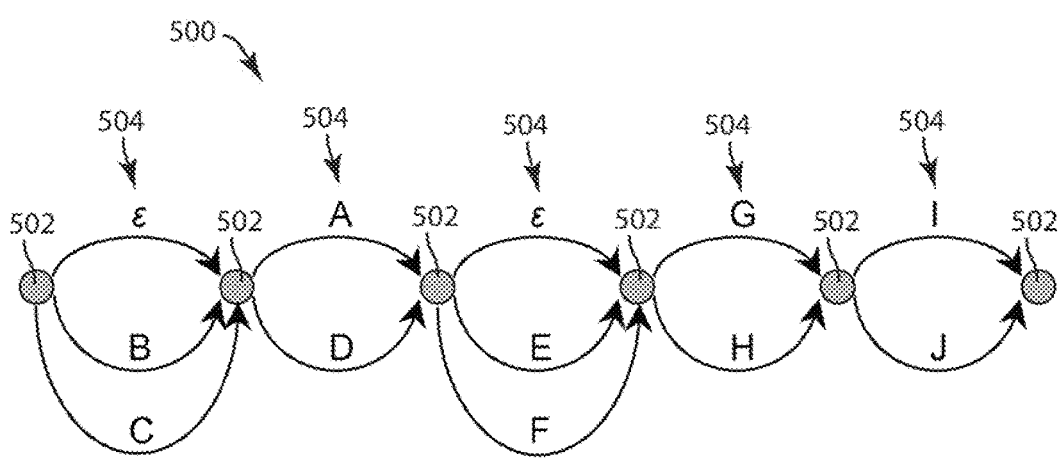
FIG. 5 depicts an exemplary embodiment of a confusion network derived from at least one word lattice.

FIG. 5 depicts a non-limiting exemplary embodiment of a confusion network 500 constructed exemplarily from the word lattice 400 depicted in FIG. 4. A confusion network is a linear sequence of nodes 502, which are associated with average time-stamps, such that a confusion network arc may only connect two consecutive nodes 502. For this reason, the network arcs can be grouped into bins 504, where the arcs of a single bin 504 represent the various word alternatives for the relevant time segment. The confusion network arcs are weighted by probability values, where the probabilities of the arcs over a single bin sum up to 1. The confusion network may further be thought of as the weighted average of all word alternatives encoded in the lattice. To make this averaging possible, it is necessary to allow $\epsilon$-labels in the confusion network, namely to allow for arcs that are not associated with output words.

Referring back to the method 300, an overall accuracy of the LVCSR output can be estimated from the confusion network probabilities. In an example wherein a model or models used in the LVCSR are a good fit, the majority of the word bins contain a single word whose probability is high (close to 1), and their adjacent $\epsilon$-bins contain only a single arc with $\epsilon$-label, which naturally has probability of 1. On the other hand, in an example wherein the audio has poor conformity to the acoustic model, or the spoken utterances have poor conformity to the language model, the LVCSR output becomes more uncertain, and the confusion network will contain more alternatives. As the result becomes more uncertain, the expected probability of the most probable word in the word bins will be smaller, and the probability of non-epsilon arcs in the $\epsilon$-bins increases. In an embodiment, the complexity of a word lattice or confusion network may be used as a rough estimate of transcription quality, as in embodiments generally higher quality transcriptions will have fewer alternative paths between nodes or within bins.

The LVCSR output can be evaluated on a per-utterance basis at 310 or to provide on overall analysis of the transcription at 312. Exemplarily as described with respect to 314, a plurality of $\rho$ values representative of the quality of a per-utterance conformity can be calculated as described herein. A quality score representative of the quality of the conformity of the language model used in the LVCSR to the audio data can be derived based on the above-noted characteristics of the confusion network. Given a confusion network, let $\rho_k$ be the probability of the most probable arc in the kth bin. The following equation us used to calculate $\rho$:

$$\rho = \frac{1}{n} \cdot \sum_{j=1}^{n} p_{2j-1} \cdot p_{2j}$$

Note that in the above equation to calculate $\rho$, the joint probability of each $\epsilon$-bin and the word bin that precedes it is considered. Thus, $\rho$ may be characterized as the average of these joint probabilities.

Figure 6:
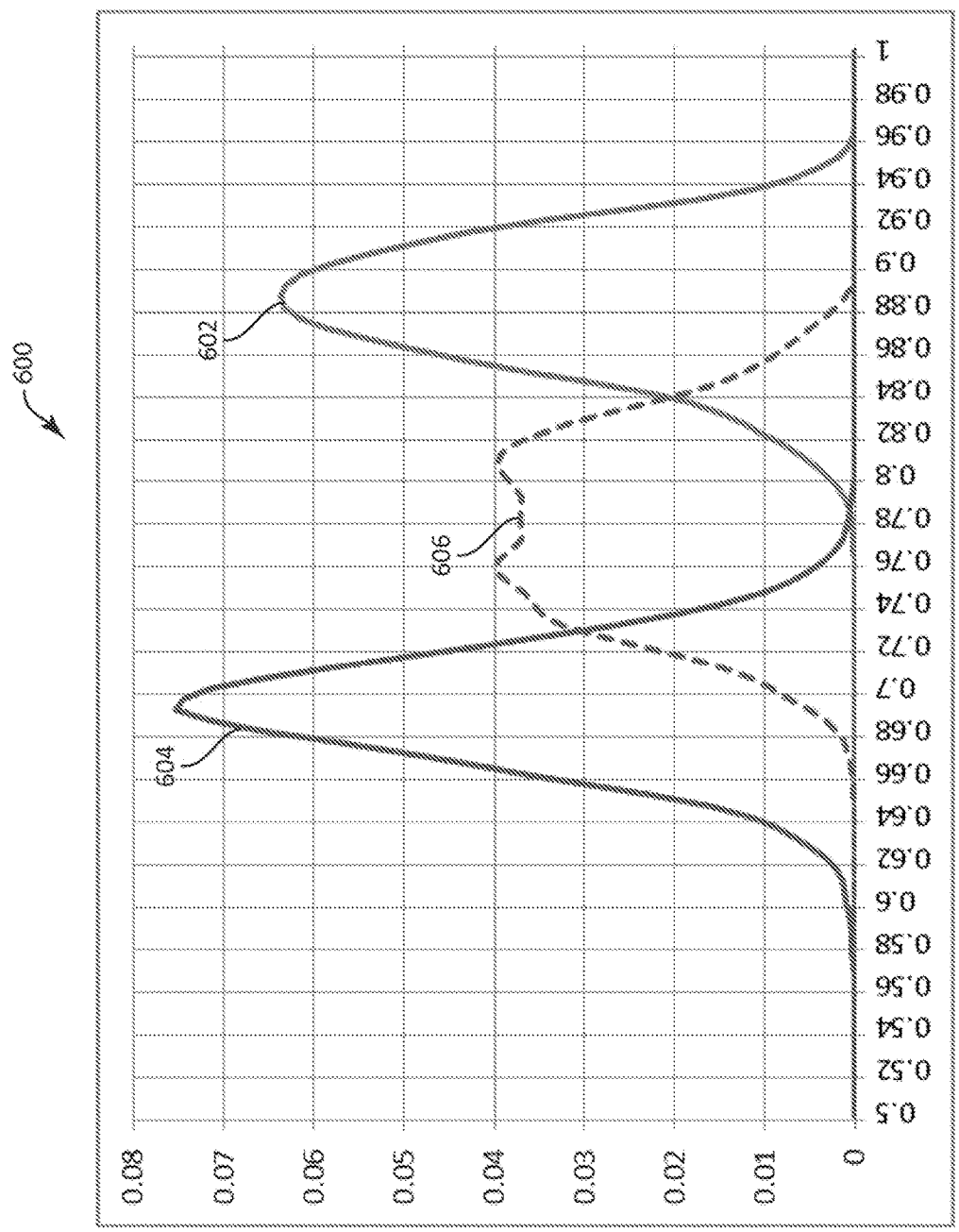
FIG. 6 depicts a graph of exemplary utterance conformities when transcribed with different models.

The value of $\rho$ can clearly separate cases where there is a good conformity of the audio data to the language model use in the LVCSR and cases where the conformity is poor. FIG. 6 depicts a graph 600 of exemplary distributions of utterance conformity with different LVCSR models. An exemplary set of a few thousand utterances in different languages were each transcribed with a conforming model. The same set of utterances were also transcribed using a mismatched model (e.g. English utterances transcribed using a Spanish model), or a partially mismatched model (e.g. a model for a different dialect of the same language or a model for a different technical field). The distribution of $\rho$ for each of these scenarios is shown in the graph 600 in FIG. 6. Graph 602 denotes the distribution of $\rho$ for the conforming model transcriptions. Graph 604 denotes the distribution of $\rho$ for the mismatched model. Graph 606 denotes the distribution of $\rho$ for the partially mismatched model.

Given a transcribed conversation comprised of several utterances, it is possible to compute the conformity ratio $\rho$ per utterance at 314 in the manner as described above. As described above, the conformity ratio per utterance can be used to select the highest quality portions of the selected high quality transcriptions for use in creating the adapted language model as described above with respect to FIG. 1.

Starting at 312, the confusion network from 308 can be used to perform an overall analysis of a transcription. Given a confusion network that represents the LVCSR output for a specific speech utterance, it is possible to compute the value of $\rho$ in order to evaluate the quality of the overall transcription. Moreover, in an embodiment wherein a conversation that comprises a sequence of M utterances is transcribed, the average $\rho$ value over all utterances can be computed at 316. Let $n^{(i)}$ be the number of words in the best path of the ith utterance and let $p_k^{(i)}$ be the probability of the best alternative in the kth bin of the confusion matrix for this utterance, the equation becomes:

$$\hat{\rho} = \frac{\sum_{i=1}^{M} \sum_{j=1}^{n^{(i)}} p_{2j-1}^{(i)} \cdot p_{2j}^{(i)}}{\sum_{i=1}^{M} n^{(i)}}$$

Depending upon the conformity of the language model to the language of the audio data, the distributions of $\hat{\rho}$ may generally appear as depicted in FIG. 6 and described above. It is possible to map at 318 either the $\rho$ or $\hat{\rho}$ value to a transcription quality score, which is exemplarily a number between 0 and 100. The transcription quality score gives an initial evaluation for the LVCSR accuracy for the audio data, without actually having a manual transcription serving as the comparison basis. To this end, a non-linear mapping of $\rho$ or $\hat{\rho}$, can be used, exemplarily a sigmoid:

$$S(x) = \left[ 100 \cdot \frac{1}{1 + e^{-\sigma \cdot (x - \mu)}} \right]$$

Figure 7:
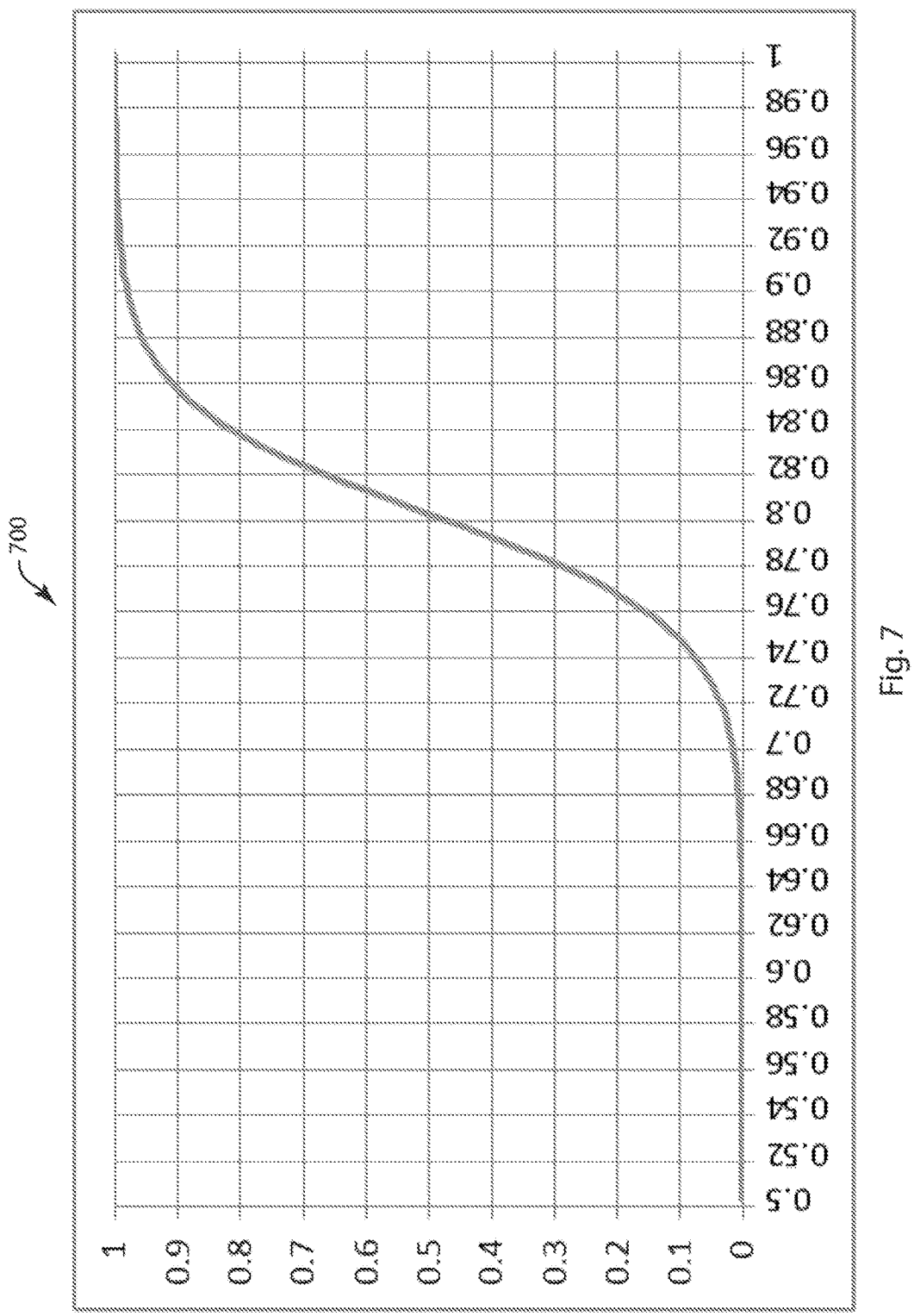
FIG. 7 depicts an exemplary graph of transcription quality as a function of utterance conformity.

For example, selecting $\mu=0.8$ and $\sigma=40$ gives us a mapping to the range exemplarily 0-100 or in the care of FIG. 7, 0-1. The transcription quality score determined at 320 can predict the actual quality of the transcription. This is exemplarily depicted in graph 700 shown in FIG. 7. By looking to the exemplary $\rho$ or $\hat{\rho}$ distributions in FIG. 6 and the normalized curve of FIG. 7, the sigmoid normalization serves to separate and clearly distinguish in the resulting normalized value between the models with transcription of quality score generally between 0.8-1.0 and mismatched models with transcription quality scores generally between 0.0-0.8.

As described above with respect to FIG. 1, the transcription quality score of either specific utterances or of a transcription as a whole can be used to filter the transcriptions of the recorded audio data files (exemplarily of customer service interactions) in order to select only those audio data tiles of a sufficiently high quality for consideration in creating the adapted language model. In a non-limiting example, a threshold may be established for the transcription quality scores that will be accepted as an audio data file that will be used in creating the adapted language model.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined, by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of automated adaptation of a language model for transcription of a call center's audio data, the method comprising:
   obtaining transcriptions corresponding to audio data from customer service interactions between one or more customers and one or more customer service agents, wherein each transcription comprises word lattices obtained using the language model;
   converting each word lattice for each transcription into a confusion network;
   computing an overall quality for each transcription based on the confusion networks corresponding to each transcription;
   filtering the transcriptions to retain only transcriptions having an overall quality above a threshold;
   calculating language statistics from the retained transcriptions;
   modifying the language model using the calculated language statistics; and
   using the modified language model for subsequent transcriptions of the call center's audio data.

2. The method of claim 1, wherein the transcriptions are large vocabulary speech recognition (LVCSR) transcriptions.

3. The method of claim 1, wherein the converting each word lattice for each transcription into a confusion network comprises:
   applying a minimum Bayes risk decoder to each word lattice.

4. An adaptive transcription system for a call center, the adaptive transcription system comprising:
   a non-transitory computer readable storage medium storing:
      transcriptions corresponding to audio data from customer service interactions between one or more customers and one or more customer service agents, and
      a language model that mathematically represents the statistical distribution of words and terms expected in the customer service interactions; and
   a processor communicatively coupled to the non-transitory computer readable storage medium, wherein the processor executes computer readable instructions that cause the processor to:
      periodically update the language model by:
         obtaining the transcriptions corresponding to audio data from customer service interactions during a period, wherein each transcription comprises word lattices obtained using the language model,
         converting each word lattice for each transcription into a confusion network,
         computing an overall quality for each transcription based on the confusion networks corresponding to each transcription,
         filtering the transcriptions to retain only transcriptions having an overall quality above a threshold,
         calculating language statistics from the retained transcriptions, and
         modifying the language model using the calculated statistics.

5. The adaptive transcription system for a call center according to claim 4, wherein the modifying the language model using the calculated language statistics comprises:
   adapting the language model stored on the non-transient computer readable medium with the modified language model, wherein the adapted language model includes all previous modifications to the language model.

6. The adaptive transcription system for a call center according to claim 4, wherein the modifying the language model using the calculated language statistics comprises:
   replacing the language model stored on the non-transient computer readable medium with the modified language model.

7. A non-transitory computer readable storage medium containing computer readable instructions that when executed by a processor of a computing device cause the computing device to perform a method comprising:
   obtaining transcriptions corresponding to audio data from customer service interactions between one or more customers and one or more customer service agents, wherein each transcription comprises word lattices obtained using the language model;

converting each word lattice from each transcription into a confusion network;

computing an overall quality for each transcription based on the confusion networks corresponding to each transcription;

filtering the transcriptions to retain only transcriptions having an overall quality above a threshold;

calculating language statistics from the retained transcriptions;

modifying the language model using the calculated language statistics; and using the modified language model for subsequent transcriptions of the call center's audio data.

8. The method according to claim 4, wherein the periodic update of the model occurs after a new product is introduced and the transcriptions correspond to audio data from customer service interactions corresponding to the new product.

9. The method according to claim 1, wherein the calculating language statistics from the retained transcriptions comprises:
   computing occurrences of a word, a word pair, a word triplet, a phrase, or a script in the retained transcriptions, and
   determining that the word, the word pair, the word triplet, the phrase, or the script is likely based on the computed number of occurrences.

10. The method according to claim 9, wherein the calculating language statistics from the retained transcriptions further comprises:
    comparing the occurrences of the word, the word pair, the word triplet, the phrase, or the script in the retained transcriptions to a baseline, and
    determining that the word, the word pair, the word triplet, the phrase, or the script in the retained transcriptions has increased or decreased from the baseline.

11. The method according to claim 1, wherein the transcriptions correspond to customer service interactions in a particular language and the modified language model comprises vocabulary and relationships between words corresponding to the particular language.

12. The method according to claim 1, wherein the transcriptions correspond to customer service interactions in a particular dialect and the modified language model comprises vocabulary and relationships between words corresponding to the particular dialect.

13. The method according to claim 1, wherein the transcriptions correspond to customer service interactions in a particular industry or field and the modified language model comprises vocabulary and relationships between words corresponding to the particular industry or field.

14. The method according to claim 1, wherein the transcriptions correspond to customer service interactions are related to a particular service, product, or issue and the modified language model comprises vocabulary and relationships between words corresponding to the particular service, product, or issue.

15. The method according to claim 1, wherein the obtaining, converting, computing, filtering, calculating, and modifying are performed iteratively to periodically modify the language model used for transcription of the call center's audio data.

16. The method according to claim 1, wherein the confusion network comprises time segments and one or more word alternatives for each time segment, and wherein each word alternative in a time segment is assigned a probability that it was correctly transcribed.

17. The method according to claim 16, wherein computing an overall quality for each transcription based on the confusion networks corresponding to each transcription, comprises, for each transcription:
    selecting an utterance;
    obtaining the confusion network for the utterance;
    determining the word alternative with the highest probability in each time segment of the confusion network;
    computing a joint probability for adjacent segments using the word alternatives with the highest probability;
    averaging the joint probabilities for adjacent segments to determine a quality for the utterance;
    repeating the selecting, obtaining, determining, computing, and averaging for other utterances in the transcript; and
    determining the overall quality for the transcript as the average of the qualities for each utterance in the transcript.

18. The method according to claim 1, wherein the filtering the transcriptions to retain only transcriptions having an overall quality above a threshold, comprises:
    mapping, using a nonlinear function, the overall quality for each transcription to a quality score between 0 and 1, wherein the mapping enhances the filtering by separating the quality scores for transcriptions near the threshold; and
    comparing the quality scores to the threshold.

* * * * *